(12) United States Patent
Rubenstein et al.

(10) Patent No.: US 6,702,237 B2
(45) Date of Patent: Mar. 9, 2004

(54) APPARATUS AND METHOD FOR ANCHORING A CABLE

(75) Inventors: Brandon Aaron Rubenstein, Loveland, CO (US); Daniel Paxton, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/159,025

(22) Filed: Jun. 3, 2002

(65) Prior Publication Data

US 2003/0222185 A1 Dec. 4, 2003

(51) Int. Cl.⁷ .................................................. F16L 3/00
(52) U.S. Cl. ........................ 248/68.1; 248/49; 248/65
(58) Field of Search ........................... 248/51, 52, 68.1, 248/49, 65

(56) References Cited

U.S. PATENT DOCUMENTS

| 1,316,255 | A | * | 9/1919 | Rauch | 248/68.1 |
|---|---|---|---|---|---|
| 2,542,442 | A | * | 2/1951 | Weber | 248/68.1 |
| 2,980,404 | A | * | 4/1961 | Anderson et al. | 165/172 |
| 2,990,150 | A | * | 6/1961 | Weigel et al. | 248/68.1 |
| 3,288,408 | A | * | 11/1966 | Acker | 248/61 |
| 3,722,843 | A | * | 3/1973 | Enckler | 248/300 |
| 4,605,059 | A | * | 8/1986 | Page | 165/163 |
| 5,277,006 | A | * | 1/1994 | Ruster | 52/220.7 |
| 5,815,369 | A | * | 9/1998 | Quesada | 361/686 |
| 5,908,179 | A | * | 6/1999 | Fimbres | 248/51 |
| 6,003,804 | A | * | 12/1999 | Vara | 242/400.1 |
| 6,170,784 | B1 | * | 1/2001 | MacDonald et al. | 248/65 |
| 6,375,017 | B1 | * | 4/2002 | Schattner et al. | 211/85.13 |

FOREIGN PATENT DOCUMENTS

FR         0 088 363      *  9/1983  ............. F28F/9/00

* cited by examiner

*Primary Examiner*—Ramon O. Ramirez
*Assistant Examiner*—Amy J. Sterling

(57) ABSTRACT

A device for anchoring one or more cables including a body having a first section and a second section. The second section includes at least one anchor member having a first side and a second side, and the second section extends generally from the first section. The at least one anchor member includes a plurality of notches extending along at least one side of the anchor member.

20 Claims, 4 Drawing Sheets

APPARATUS AND METHOD FOR ANCHORING A CABLE

FIELD OF THE INVENTION

This invention relates generally to cable anchoring devices, and more particularly to a bracket and a technique for supporting one or more cables configured for attachment to a computer device.

BACKGROUND OF THE INVENTION

Computer devices, e.g., servers, personal computers, computer racks, etc., often contain various components that must be individually powered. The computer devices are thus typically connected to a power supply through at least one power cable. The computer devices are also often connected to various peripheral devices, e.g., a network, printer, modem, etc., through one or more data cables. To organize and accommodate these cables, various hardware and attachment devices may be implemented. For example, conduit clamps and clips, one-hole straps, tie wires, rod couplings, cable wire loops, etc. Conventional anchoring systems are typically fabricated of a bracket or anchor that is securely applied to a mounting surface and a closed slot through which a cable strap or tie wire must be threaded so that it may then be placed about one or more cables.

There are, however, problems inherent with the attachment devices implemented in conventional anchoring systems. For instance, conventional anchoring systems are often comprised of a plurality of components, e.g., bracket and cable tie, components that are movable with respect to each other, and the like. This generally increases the complexity of the anchoring systems as well as the difficulty in installation of the anchoring systems as well as the connection of the cables to the computer devices. In addition, cable ties often include one-way teeth for preventing unintended disengagement of the cable tie. Thus, if a user desires to remove a cable tie of this type, the user is often required to cut through the cable tie. As a result, the user may unintentionally cut through one or more of the cables.

Moreover, conventional anchoring systems are often difficult to implement because of their complexity, which may make it difficult to remove the cables from the computer devices, as for example, when a peripheral device is removed or replaced. In addition, conventional anchoring systems tend to be relatively inflexible, and may permit stresses and strains to be imposed on the cable ties, the cables and the anchor, which may reduce cable performance under certain circumstances.

SUMMARY OF THE INVENTION

In one embodiment, the present invention relates to a device for anchoring one or more cables. The device includes a body having a first section and a second section. The second section includes at least one anchor member having a first side and a second side, and the second section extends generally from the first section. The at least one anchor member includes a plurality of notches extending along at least one side of the anchor member.

BRIEF DESCRIPTION OF THE DRAWINGS

Features and advantages of the present invention will become apparent to those skilled in the art from the following description with reference to the drawings, in which.

DETAILED DESCRIPTION OF THE INVENTION

For simplicity and illustrative purposes, the principles of the present invention are described by referring mainly to embodiments thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention. In addition, the term "bracket" is not intended as a limitation, but rather, should be understood to mean any device capable of supporting and/or anchoring a cable.

According to an embodiment of the present invention, a bracket may be implemented to securely hold in place cables for delivering power and/or for transmitting data to a computer device, e.g., server, personal computer, computer rack, etc. In addition, the bracket is configured to enable the cables to be removed from the computer device in a relatively simple manner. The bracket is further configured to enable the cables to be removed from the bracket in a relatively simple manner. Thus, the bracket is designed to securely maintain cables in place to substantially prevent unintended removal of the cables from the computer device and to also enable relatively easy removal of the cables. In order to accomplish the above-described functions, the bracket includes a plurality of notches configured to receive the cables in a generally serpentine configuration.

Figure 1A:
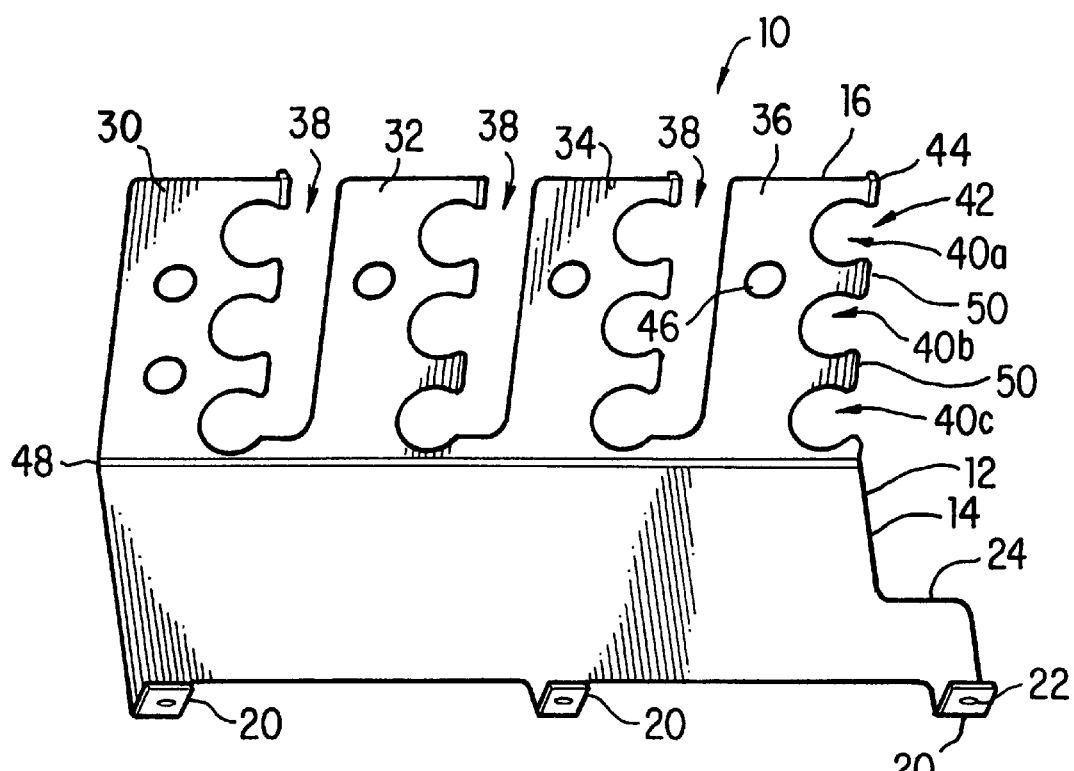
FIG. 1A is a perspective view of a bracket for anchoring one or more cables according to an embodiment of the present invention.

Referring first to FIG. 1A, there is illustrated a perspective view of a bracket 10 for anchoring one or more cables according to a first embodiment of the present invention. The bracket 10 includes a body 12 that may be formed from an reasonably suitable material e.g., a substantially rigid material or a wire form material. Examples of suitable materials may include steel, plastic, aluminum, and like materials. The body 12 has a first section 14 and a second section 16. The second section 16 is preferably positioned at an angle with respect to the first section 14 at a joint 48. As will become better understood upon reading of the present disclosure, the angle between the first section 14 and the second section 16 provides added rigidity to the bracket 10 which translates to greater support in preventing unintended removal of the one or more cables from a computer device (not shown). It should, however, be understood that the first section 14 and the second section 16 may lie in the same plane without deviating from the scope and spirit of the invention.

The first section 14 is illustrated as possessing a plurality of upstanding members 20 for attaching the body 12 to a substrate. Each of the upstanding members 20 includes an aperture 22 for enabling a fastening device (not shown), e.g., a threaded screw, to be inserted therethrough. In addition, the apertures 22 are preferably spaced apart from one another to correspond to the spacing of pre-constructed holes (not shown) on a substrate. The pre-constructed holes may comprise substantially any holes, however, they may preferably be formed to receive fastening devices (not shown) for maintaining cable ends in position with respect to the substrate, e.g., to receive screws to secure printer cable. In this respect, the pre-constructed holes may be positioned along the substrate in a manner generally known to those skilled in the art.

Although a preferred number of upstanding members 20 and their spacing with respect to each other are illustrated in FIG. 1A, it should be understood that any reasonably suitable number of upstanding members 20 spaced in any reasonably suitable manner may be implemented in the invention without deviating from the scope and spirit thereof.

The first section 14 may include a cut-out portion 24 to generally enable the bracket 10 to mount to substrates having pre-constructed holes that are spaced at various distances from each other or otherwise conform to the shape of the intended substrate.

The second section 16 is illustrated as containing a plurality of anchor members 30–36. The anchor members 30–36 extend generally away from the joint 48 between the first section 14 and the second section 16. The two middle anchor members 32 and 34 are separated from adjacent anchor members 30–36 to form gaps 38 therebetween. The gaps 38 are preferably sized to enable cables having a wide variety of diameters to pass therethrough.

Each of the anchor members 30–36 includes three notches 40a–40c. Each of the notches 40a–40c possesses a substantially rounded configuration with a notch opening 42 extending generally perpendicularly to the transverse direction of the anchor members 30–36. In addition, the centrally located notch 40b is spaced apart from the outer notches 40a and 40c by a portion 50 of the anchor members 30–36. The notch opening 42 preferably possesses a height that is generally sized to enable cables having a wide variety of diameters to pass therethrough.

Each of the anchor members 30–36 also includes a supporting member 44 for assisting in maintaining the cables within the notches 40a–40c to thereby safeguard against unintended removal of the cables from the notches 40a–40c. In addition, the anchor members 30–36 also include a plurality of through holes 46 which may be used to further support the cables with a separate fastening device, e.g., cable tie, one-hole strap, tie wire, etc.

Although FIG. 1A illustrates the bracket 10 as having four anchor members 30–36, each possessing three notches 40a–40c, it should be noted that any reasonably suitable number of anchor members and notches may be utilized in the bracket 10 without deviating from the scope of the invention. Thus, the bracket 10 may be designed to anchor any reasonably suitable number of cables.

Figure 1B:
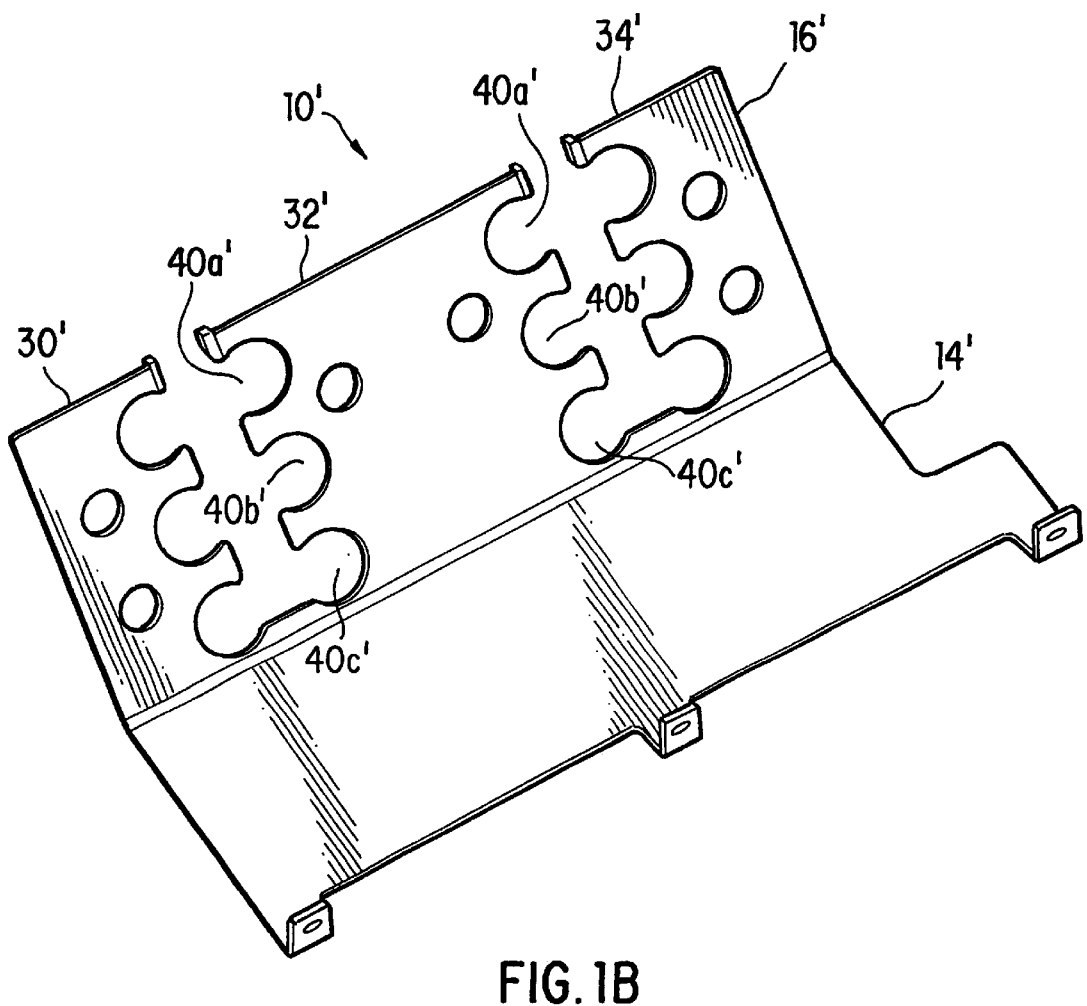
FIG. 1B is a perspective view of a bracket similar to the bracket illustrated in FIG. 1A according to another embodiment of the invention.

Referring to FIG. 1B, there is illustrated a perspective view of a bracket 10'. The bracket 10' includes a first section 14' that is substantially similar to the first section 14 illustrated in FIG. 1A. The bracket 10' also includes a second section 16' having some of the same features as the second section 16 illustrated in FIG. 1A. However, as illustrated in FIG. 1B, the bracket 10' includes three upstanding members 30'–34'. Upstanding member 32' includes a plurality of notches 40a'–40c' located on opposite sides of the upstanding member 32'. In addition, the notches of the upstanding member 34' generally face toward the notches of the upstanding member 32'.

Although two embodiments of the bracket 10, 10' are illustrated in FIGS. 1A and 1B, it should be understood that the bracket may comprise any reasonably suitable configuration without departing from the scope of the present invention.

Figure 2:
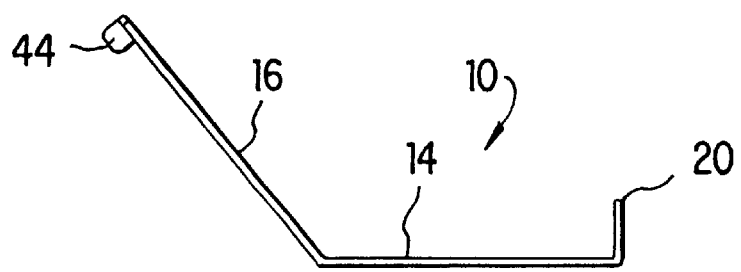
FIG. 2 is side elevational view of the bracket of FIG. 1A.

With reference now to FIG. 2, there is illustrated a side elevational view of the bracket 10 of FIG. 1A. FIG. 2 better illustrates how the second section 16 is angled with respect to the first section 14 as well as the manner in which the upstanding members 20 are angled with respect to the first section 14.

Figure 3:
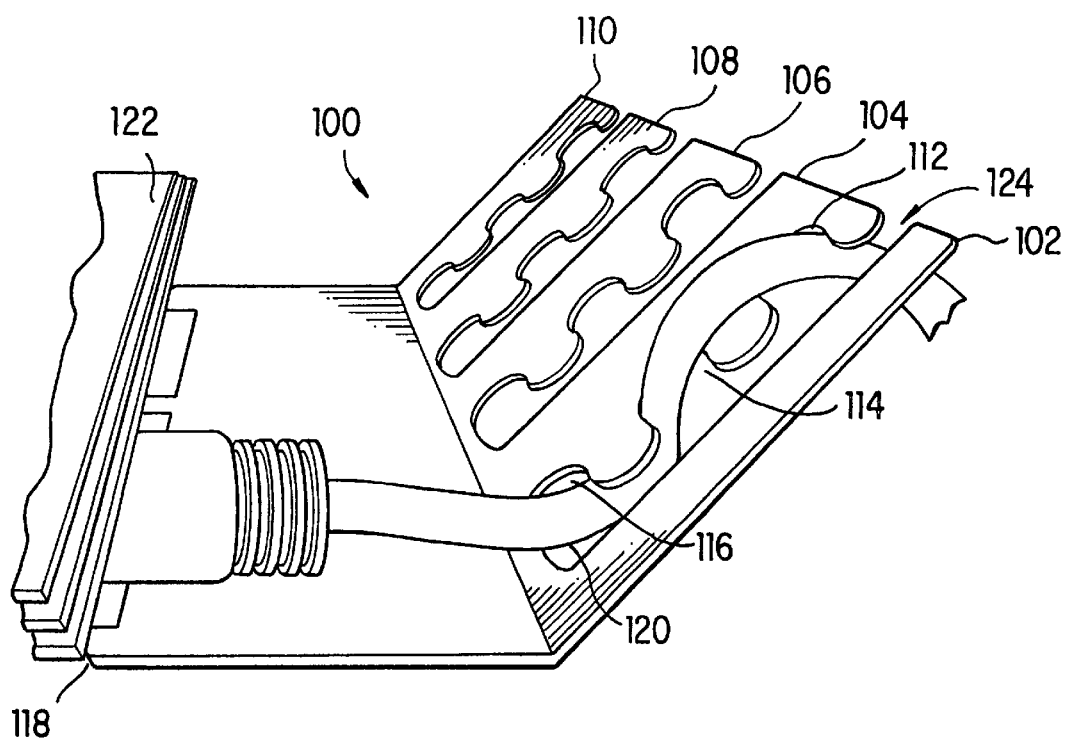
FIG. 3 is a perspective view of a bracket for anchoring one or more cables along with a cable according to another embodiment of the present invention.

Turning now to FIG. 3, there is illustrated a perspective view of a bracket 100 for anchoring one or more cables along with a cable 120 according to another embodiment of the present invention. The bracket 100 is illustrated as being attached to a substrate 122, in this instance a computer device, with upstanding members 118.

As shown in FIG. 3, the bracket 100 possesses a similar configuration to the bracket 10 illustrated in FIG. 1A, with a few variations. For example, the bracket 100 possesses a side member 102 spaced from an anchor member 104 with a gap 124 being formed therebetween. In addition, the anchor members 104–110 do not possess the through holes 46 and the supporting members 44 illustrated in the bracket 10.

A method of implementing the bracket 10 illustrated in FIG. 1A will now be discussed with respect to FIG. 3. As shown in FIG. 3, the cable 120 is inserted into the notches 112–116 of the anchor member 104. By virtue of the substantially circular configuration of the notches 112–116, the cable 120 may become seated within the notches 112–116 upon insertion thereof into the notches 112–116. More specifically, the cable 120 is arranged in a generally serpentine manner through the notches 112–116. In this respect, the cable 120 is anchored by the anchor member 104 by repeatedly causing the cable 120 to extend through the plane of the anchor member 104. The cable 120 is thus caused to be substantially firmly held in place in the anchor member 104 by operation of the friction caused between the cable 120 and the anchor member 104. Moreover, because the bracket 100 includes an angled section through which the cable 120 is configured to extend, the bracket 100 is able to absorb a greater amount of force on the cable 120. By virtue of this configuration, the cable 120 is substantially prevented from unintentional disengagement from the substrate.

In addition, the anchor members 104–110 are spaced from the substrate 122 to provide sufficient space to enable an end of the cable 120 to be inserted into the substrate 122.

Figure 4:
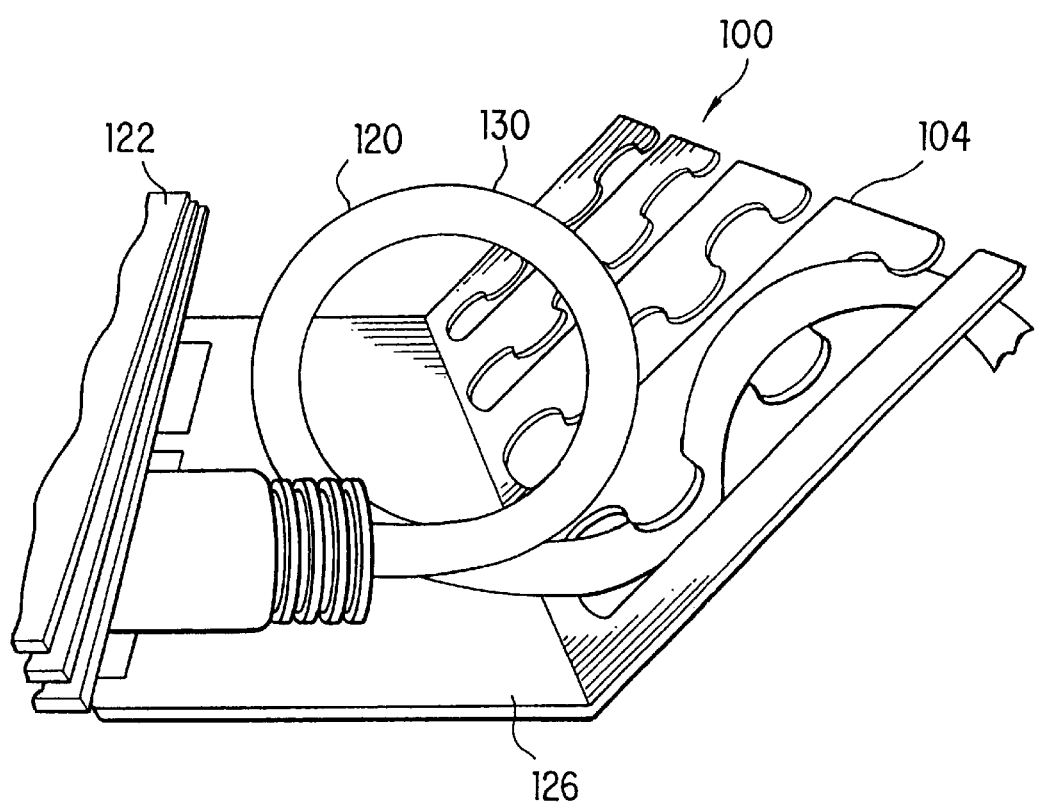
FIG. 4 is a perspective view of a bracket for anchoring one or more cables along with a cable according to a further embodiment of the present invention.

FIG. 4 illustrates an alternate embodiment of implementing the bracket 100 to anchor a cable 120. As shown in FIG. 4, a first section 126 the bracket 100 is sufficiently wide to enable a service loop 130 of the cable 120 to be formed. As is known to those skilled in the art, the service loop 130 is often beneficial in enabling relatively simple insertion and removal of the cable 120 from the substrate 122. The service loop 130 also facilitates removal of the cable 120 in a relatively quick manner. In addition, strain relief may be provided through the friction inherent between the cable 120 and the anchor member 104.

As illustrated in FIGS. 3 and 4, the cable 120 undergoes a relatively small amount of bending, thus resulting in relatively small stresses and strains being applied to the cable 120 by the bracket 100.

What has been described and illustrated herein is are certain embodiments of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A device for anchoring one or more cables to an electronic apparatus, said device comprising:

a body having a substantially planar first section having a length and a width and a longitudinal axis along the length, a substantially planar second section having a length and a width, and a longitudinal axis along the length, and one or more third sections;

said second section is attached to a first end of said first section along the longitudinal axes of the first section and the second section at an angle between 90 and 180 degrees with respect to the first section and is comprised of at least one anchor member having a first side and a second side;

said at least one anchor member includes a plurality of notches extending along at least one side of said anchor member, wherein said plurality of notches have openings and wherein said openings face a direction generally parallel with the longitudinal axis of the second section; and said one or more third sections are attached to a second end of said first section and are angled with respect to the first section, wherein said one or more third sections comprise holes for attaching the body to the electronic apparatus.

2. The device according to claim 1, wherein said body is formed of a substantially rigid material.

3. The device according to claim 1, wherein said angle between said first section and said second section is approximately 135 degrees.

4. The device according to claim 1, wherein said second section comprises a plurality of anchor members spaced apart from one another.

5. The device according to claim 1, wherein said at least one anchor member comprises three notches.

6. The device according to claim 1, wherein each of said plurality of notches open in a direction generally perpendicularly to the direction of extension of said anchor member from said first section.

7. The device according to claim 1, wherein said at least one anchor member comprises at least one aperture.

8. The device according to claim 1, wherein said plurality of notches each comprises a substantially rounded configuration such that the height of each opening of said plurality of notches is smaller than the diameter of said plurality of notches.

9. The device according to claim 1, wherein said one or more third sections extend generally perpendicularly to said first section and are positioned at one or more locations along said second end of said first section generally away from said second section.

10. A method for anchoring a cable to an electronic component, said method comprising:

attaching a bracket to the electronic component, said bracket having first, second and third sections, said second section and third section being angularly attached to separate ends of the first section, said second section comprising a plurality of notches and first and second surfaces, said third section comprising one or more holes for attaching said bracket to said electronic component; and inserting said cable into said plurality of notches such that said cable extends through alternating ones of said first and second surfaces in a substantially serpentine configuration.

11. The method according to claim 10, further comprising connecting said cable to said electronic component.

12. The method according to claim 11, further comprising forming a service loop in said cable prior to said step of connecting said cable to said electronic component.

13. The method according to claim 10, wherein said step of attaching said bracket to said electronic component comprises inserting at least one mechanical fastener through said one or more holes and into pre-existing threaded openings in said electronic apparatus.

14. The method according to claim 10, further comprising:

inserting a plurality of cables into a plurality of sets of notches.

15. A device for anchoring one or more cables, said device comprising:

means for supporting said one or more cables in a substantially serpentine configuration, said supporting means comprising first, second and third sections, said second section and third section being angularly attached to separate ends of the first section, said second section comprising a plurality of notches; and means for substantially preventing unintended removal of said one or more cables from a substrate.

16. The device according to claim 15, wherein said second section of the supporting means comprises one or more protruding sections, said plurality of notches being formed on said one or more protruding sections.

17. The device according to claim 15, wherein said third section comprises means for connecting said supporting means to an electronic component.

18. The device according to claim 15, further comprising means for connecting said one or more cables to said supporting means.

19. A method for anchoring a cable, said method comprising:

attaching a bracket having a plurality of notches and first and second surfaces to a substrate;

inserting said cable into said plurality of notches such that said cable extends through alternating ones of said first and second surfaces in a substantially serpentine configuration, wherein said plurality of notches face substantially the same direction; and forming a service loop in said cable prior to said step of connecting said cable to said substrate.

20. A method according to claim 19 wherein said step of attaching said bracket to said electronic component comprises inserting at least one mechanical fastener through said one or more holes and into pre-existing threaded openings in said electronic apparatus.

* * * * *